(12) United States Patent

Choudhury et al.

(10) Patent No.: US 12,688,152 B2

(45) Date of Patent: Jul. 21, 2026

(54) HYPER-SCALE, ELASTIC, SMART, SHARED, DATABASE AWARE STORAGE

(71) Applicant: Oracle International Corporation, Redwood Shores, CA (US)

(72) Inventors: Nilesh Choudhury, Redwood City, CA (US); Juan R. Loaiza, Woodside, CA (US); Kothanda Umamageswaran, Sunnyvale, CA (US); Jia Shi, Campbell, CA (US); Vijay Sridharan, Santa Clara, CA (US); Alexander Tsukerman, Foster City, CA (US); Siddharth Choudhary, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/885,394

(22) Filed: Sep. 13, 2024

(65) Prior Publication Data

US 2025/0094385 A1 Mar. 20, 2025

Related U.S. Application Data

(60) Provisional application No. 63/583,174, filed on Sep. 15, 2023.

(51) Int. Cl.
*G06F 16/13* (2019.01)

(52) U.S. Cl.
CPC .................................. *G06F 16/13* (2019.01)

(58) Field of Classification Search
None
See application file for complete search history.

(56) References Cited

U.S. PATENT DOCUMENTS

| | | | | |
|---|---|---|---|---|
| 7,284,011 B1 * | 10/2007 | Narayanaswamy | .. | G06F 16/283 |
| | | | | 707/999.102 |
| 9,053,167 B1 | 6/2015 | Swift et al. | | |
| 10,467,688 B1 * | 11/2019 | Riehl | ..................... | G06Q 20/14 |
| 10,803,012 B1 * | 10/2020 | Madhavarapu | ....... | G06F 16/113 |

(Continued)

FOREIGN PATENT DOCUMENTS

EP 2973054 A1 1/2016

*Primary Examiner* — Hasanul Mobin

(74) *Attorney, Agent, or Firm* — Hickman Becker Bingham Ledesma LLP

(57) ABSTRACT

Herein is an accelerated interface between a database server and a storage area network (SAN). Persistent storage being managed for a database is spread across a number of storage buckets. Global distributed storage metadata is used only for tracking the location of storage buckets on different storage servers. With this approach, a very small amount of memory is needed at a global distributed level to maintain the map. Each storage bucket can have any number of mirrored replicas for further increasing speed and reliability. A database server contains a storage bucket map in memory, and uses the map to do database online transaction processing (OLTP) I/O and smart (i.e. offloaded) database operations on storage. This allows for direct I/O between database server and storage server with lower latency and without using slow and remote middleware such as a logical unit number (LUN) metadata server on a separate network element.

16 Claims, 6 Drawing Sheets

(56)                    References Cited

U.S. PATENT DOCUMENTS

| | | | | |
|---|---|---|---|---|
| 2002/0194015 | A1* | 12/2002 | Gordon | G06F 16/273 |
| | | | | 705/1.1 |
| 2005/0182776 | A1* | 8/2005 | Yennie | G06F 16/2477 |
| 2005/0198102 | A1 | 9/2005 | Hahn | |
| 2008/0091704 | A1* | 4/2008 | Yennie | G06F 16/283 |
| | | | | 707/999.102 |
| 2008/0263001 | A1 | 10/2008 | Lohman | |
| 2008/0270403 | A1* | 10/2008 | Bookman | G06F 8/51 |
| 2009/0157776 | A1 | 6/2009 | McGarvey | |
| 2010/0281027 | A1 | 11/2010 | Duan | |
| 2011/0225122 | A1 | 9/2011 | Denuit | |
| 2011/0238775 | A1* | 9/2011 | Wu | G06F 16/188 |
| | | | | 709/213 |
| 2013/0232215 | A1* | 9/2013 | Gupta | G06F 3/061 |
| | | | | 709/213 |
| 2015/0058302 | A1* | 2/2015 | Abney, III | G06F 16/2365 |
| | | | | 707/692 |
| 2015/0242434 | A1* | 8/2015 | Wollenstein | G06F 16/285 |
| | | | | 707/749 |
| 2016/0357743 | A1* | 12/2016 | Swaminathan | G06F 16/182 |
| 2017/0147656 | A1* | 5/2017 | Choudhary | G06F 16/256 |
| 2017/0323247 | A1* | 11/2017 | Tran | G06Q 10/067 |
| 2018/0293434 | A1* | 10/2018 | Wang | G09B 5/02 |
| 2019/0087600 | A1* | 3/2019 | Sion | H04L 9/0861 |
| 2019/0384530 | A1* | 12/2019 | Twitto | G06F 3/0659 |
| 2020/0334379 | A1* | 10/2020 | DeRosa-Grund | G06F 21/645 |
| 2022/0027338 | A1* | 1/2022 | Jo | G06F 16/214 |
| 2022/0129358 | A1 | 4/2022 | Pasupuleti et al. | |
| 2023/0072976 | A1* | 3/2023 | Lindaaker | G06F 16/9024 |
| 2023/0140153 | A1* | 5/2023 | Jernigan, IV | H04L 45/30 |
| | | | | 707/703 |
| 2023/0359593 | A1* | 11/2023 | Oza | G06F 16/1873 |
| 2024/0104081 | A1* | 3/2024 | Jernigan, IV | G06F 16/2308 |
| 2025/0094385 | A1* | 3/2025 | Choudhury | G06F 16/13 |

* cited by examiner

201 Receive request to access database extent

202 Based on request, obtain bucket number of storage bucket that can aggregate database extent 203 Based on bucket number, select storage drive in storage server 204 Access database extent in storage drive 205 Send response

FIG. 3

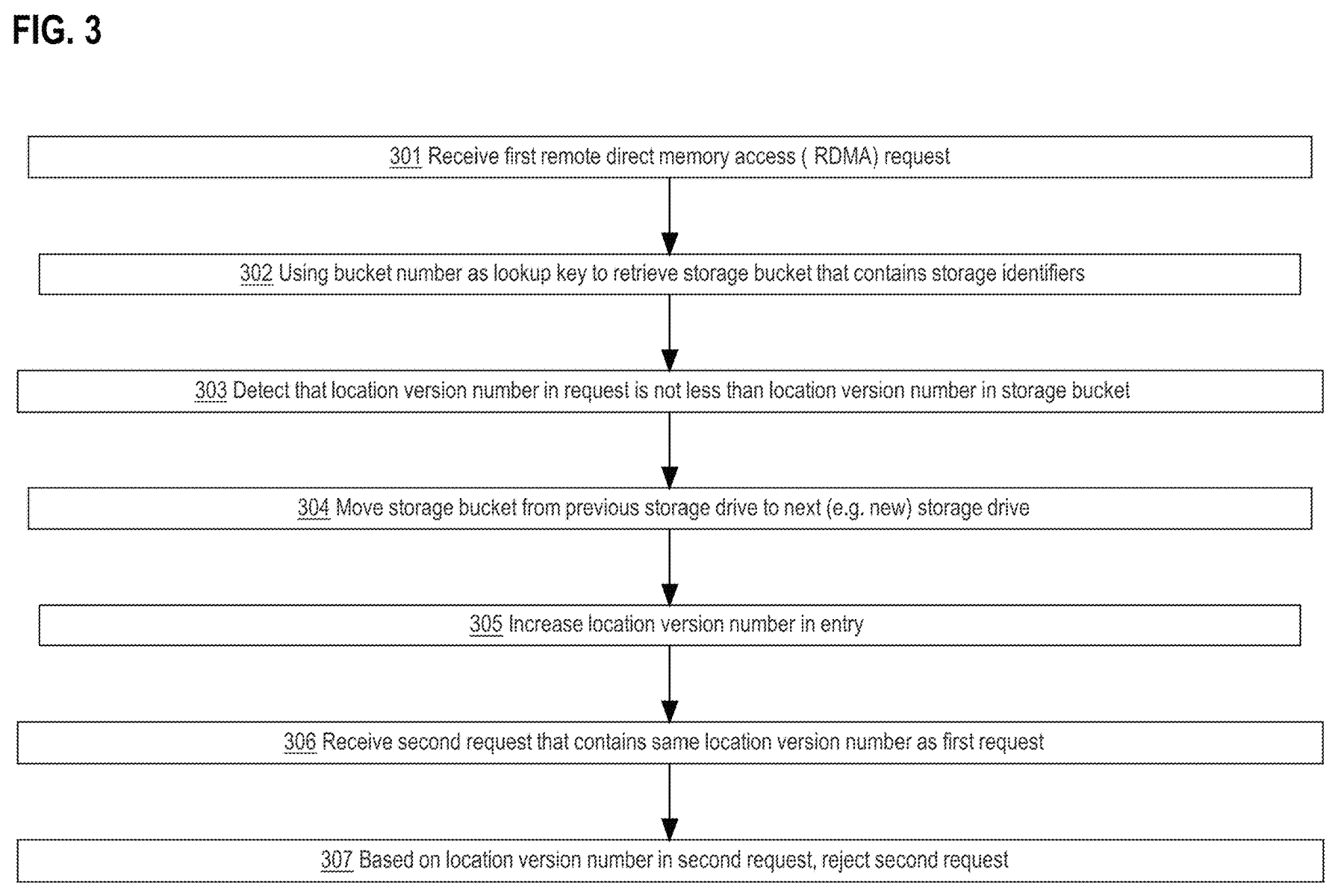

301 Receive first remote direct memory access ( RDMA) request

302 Using bucket number as lookup key to retrieve storage bucket that contains storage identifiers 303 Detect that location version number in request is not less than location version number in storage bucket 304 Move storage bucket from previous storage drive to next (e.g. new) storage drive 305 Increase location version number in entry 306 Receive second request that contains same location version number as first request 307 Based on location version number in second request, reject second request 401 Obtain bucket number of storage bucket that can aggregate database extent 402 Send first request, including location version number, to access database extent 403 Detect that first request failed because location version number is stale 404 Retrieve latest location version number 405 Send second request that represents first request

HYPER-SCALE, ELASTIC, SMART, SHARED, DATABASE AWARE STORAGE

BENEFIT CLAIM

This application claims the benefit of Provisional Application 63/583,174, filed Sep. 15, 2023, the entire contents of which is hereby incorporated by reference as if fully set forth herein, under 35 U.S.C. § 119(e).

FIELD OF THE DISCLOSURE

This disclosure relates to an accelerated interface between a database server and a storage area network (SAN).

BACKGROUND

In a state of the art persistent data storage system, a logical unit number (LUN) is a unique identifier that refers to a specific storage resource such as a storage device or a partition of a storage device. A LUN is operated as a logical address that allows compute servers or workstations to access a storage resource. Herein, a storage system that is accessed with a LUN is referred to as a LUN-based storage system. When a client wants to read or write data to a LUN-based storage device, the client must include the LUN of the storage resource in its request. This allows the storage system to correctly route the request to the storage resource.

State of the art cloud storage is exposed as emulated LUNs within a Virtual Machine, using standard block input/output (I/O) protocols. As follows, an emulated LUN is not a direct LUN. Emulated LUNs offer greater flexibility and scalability in cloud environments, and they can be easily created, deleted, and resized on demand, allowing for dynamic resource allocation and efficient utilization of storage resources by techniques such as sharing and thin provisioning. Emulated LUNs support administrative features such as snapshotting and cloning, which are essential for backup, disaster recovery, and development/testing purposes. Emulated LUNs can be managed through a centralized interface, referred to herein as a LUN metadata server, making it easier for cloud providers to manage and provision storage resources. In a state of the art computer cloud, a LUN metadata server may be referred to as a LUN Manager, a Storage Volume Manager, or a Storage Controller.

In a computer cloud, emulated LUNs are presented to a hypervisor as files within a file system. This requires the LUN metadata server to manage information about these files, such as their attributes, location, and access permissions. Because emulated LUNs support snapshotting and cloning, the LUN metadata server must track and manage the relationships between different versions of persistent data.

LUN emulation generates more network traffic than direct LUNs. Emulated LUNs use a protocol such as iSCSI or NFS to communicate between a hypervisor and a storage system. This introduces additional protocol overhead, such as header information and checksums that increase I/O message size. Emulated LUNs require filesystem operations to access data. These operations generate more network traffic because the hypervisor interacts with the storage system to read and write persistent data.

A LUN metadata server manages LUN assignment (e.g. distribution and mirroring). The LUN metadata server stores information about LUNs, such as their infrastructural location, size, and access permissions. The LUN metadata server determines where the data for a specific LUN is located and routes I/O requests accordingly. In the context of Small Computer System Interface (SCSI), the LUN metadata server is referred to as a SCSI target or a SCSI server. A SCSI server is a crucial but slow part of a state of the art storage area network (SAN), which is not the innovative SAN herein. For two separate identical requests from a same client, in a state of the art SAN, the load balancer is stateless and asks the LUN metadata server twice to resolve a same LUN, which is slow. In may cases, each use of a LUN may entail cooperation with a remote LUN metadata server. Typically a LUN metadata server, a hypervisor, and a storage server are in separate distinct network elements. In other words, every interaction with the remote LUN metadata server entails an additional network round trip just for LUN metadata.

BRIEF DESCRIPTION OF THE DRAWINGS

In the drawings:

FIG. 3 is a flow diagram that depicts example storage acceleration activities that a storage server may perform in an example scenario in which movement of a storage bucket causes an access request to become stale;

DETAILED DESCRIPTION

Figure 1:
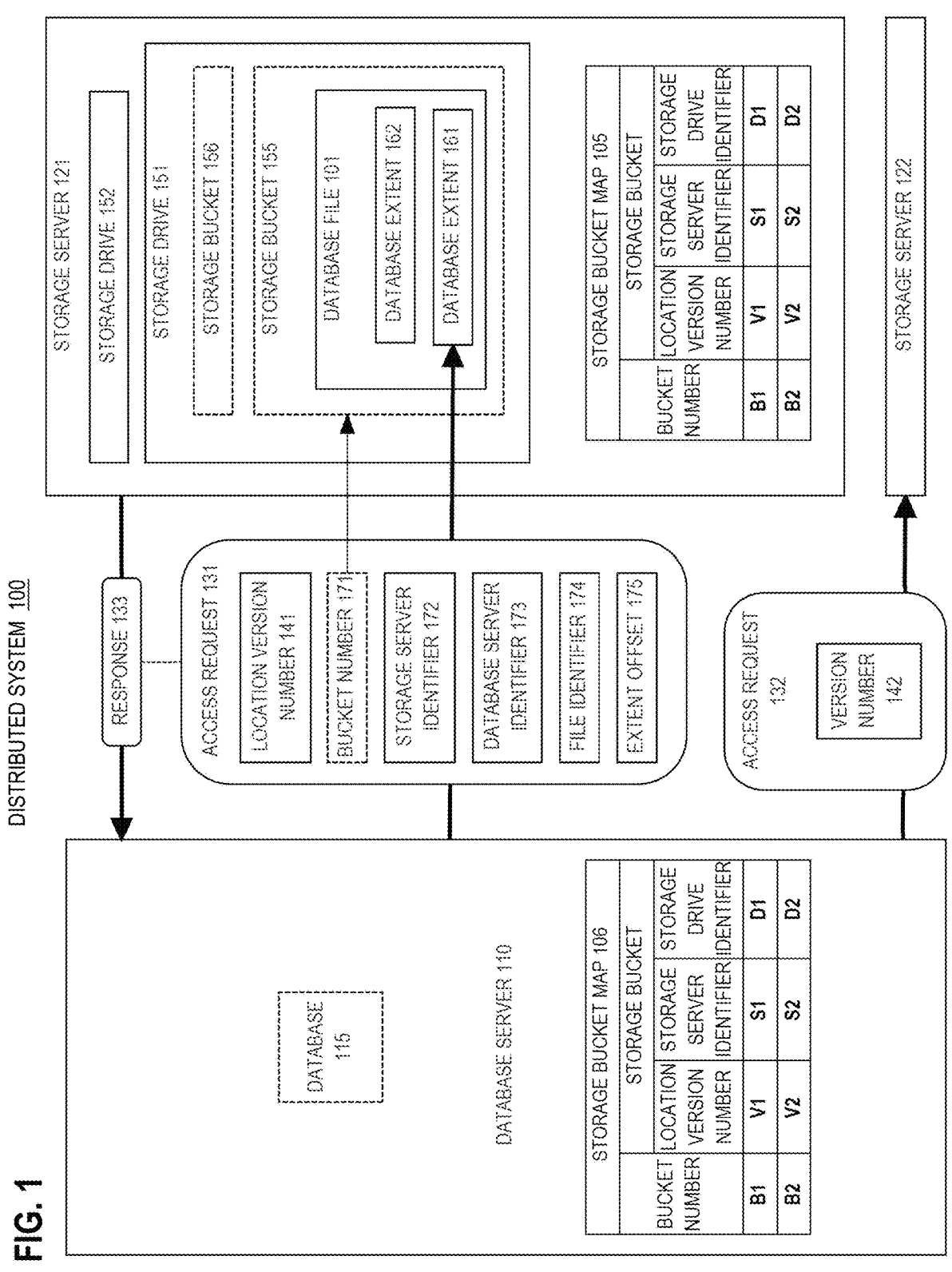
FIG. 1 is a block diagram that depicts an example distributed system that has an accelerated interface between a database server and a storage area network (SAN) that includes multiple storage servers.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Herein is an accelerated interface between a database server and a storage area network (SAN). In this approach, cloud service tenants have a very low cost of entry, because they need specify only: a) a number of CPU cores and a memory size for computation and b) a size of a distinct database-aware persistent store. This architecture makes it possible to on-demand and instantly increase and decrease the capacity of compute and storage resources. For the database cloud operator, this improves the utilization of cloud storage and compute hardware, thus lowering cost. This approach is based on a managed and giant pool of database extents that may be fragments that are not necessarily contiguous to each other, although each extent is a contiguous portion of persistent physical storage. Each database file is stored in multiple database extents that are small enough to allow the database to be distributed on thousands of disks on many storage servers to distribute input/output (I/O), which decreases database latency and increases database throughput and reliability. These same extents are also large enough that each extent achieves good sequential performance when scanning contiguous data.

Herein, the total storage being managed is spread across a number of storage buckets. The number of buckets may be proportional to the total size of the storage being managed. Each bucket may map to tens of gigabytes of storage. Herein, global distributed storage metadata is used only for tracking the location of storage buckets on different storage servers. This makes the global distributed metadata very small, such as a million times smaller than other distributed storage implementations. With this approach, a very small amount of memory is needed at a global distributed level to maintain this storage bucket map. Each row or entry in the map is a storage bucket that is storage metadata that specifies which storage servers host copies of data in each storage bucket. Many database extents hash to a same storage bucket. Each storage bucket can have any number of mirrored replicas for further increasing speed and reliability.

Herein, a database server contains a storage bucket map in memory, and uses the map to do database online transaction processing (OLTP) I/O and smart (i.e. offloaded) database operations on storage. For any such persistence activities, the database server directly locates and accesses a storage server in the storage bucket map. This allows for direct I/O between database server and storage server with lower latency and without using slow and remote middleware such as a logical unit number (LUN) metadata server on a separate network element.

Replicated storage metadata herein is fast and further accelerated by optimistic (i.e. speculative) usage. However optimism means that, during the storage life cycle, there might be times when some storage buckets are moved from one storage server to another for better storage load balance or to accommodate a change in a count of storage servers. Herein, database servers continue to do I/O, no matter how disruptive is a storage bucket's lifecycle. If a storage bucket is moved away from a previous storage server, the previous storage server may receive and reject stale I/O directed to the previous storage server for the storage bucket. The previous storage server reacts to a stale request by telling the database server that the database server's storage bucket map is stale. Responsively, the database server refreshes its storage bucket and retries the I/O by redirecting it to a different storage server that now is assigned (i.e. logically contains) the storage bucket. This is a loosely coupled storage architecture. This approach is unconventionally accelerated because there is no central operation that needs to wait for: a) an announcement of movement of storage bucket(s) to be pervasively received nor b) replicated metadata to be consistently updated. Each database server or storage server independently updates its own respective replica of the storage bucket map, and only that server's operations need to wait until its storage bucket map is refreshed by synchronization from another replica map on another server.

Sharing herein comes from delegating all storage management operations to the storage servers, which are completely managed by cloud service operations. Compute Virtual Machine (VM) guests provided to individual customers do not participate in storage management. This enables the best qualities of cloud computing with multi-tenancy and pooled resources, thus providing a very low cost of entry to public cloud services to customers. Every piece of persistent storage that is exposed to a database is distributed across multiple pooled storage servers, so each tenant's respective database can achieve high storage performance from all the storage resources. Each database can unleash the performance of thousands of storage CPUs for any database query, and each database can also drive the I/O performance of all shared storage resources.

At the cluster level, a database's set of storage buckets represents the entire available persistent space. Here, the number of buckets is fixed and the dynamic size of a bucket represents a dynamically weighted fragment of the entire available space. Herein, bucket weight is a combined measure of how much persistent storage space and how much storage server computation is a bucket estimated to need. Likewise herein, a storage server's storage load is a measure that is the sum of weights of all buckets that are stored in the storage server. For example, a big storage server may have twice the storage and processing capacity of a small storage server and, in that case, the big storage server may be assigned twice as much storage load as the small storage server.

Herein, the number of buckets is fixed and, when a database file is created, pieces of the file are uniformly distributed across all buckets. This means that a respective distinct piece of a same big file would likely be present in every bucket, which is counterintuitive because the state of the art instead strives for data locality. This storage layout allows for an interesting result where, in order to utilize all storage resources, the cluster manager only needs to ensure that all storage servers host enough storage buckets with total weight that is proportional to their weight capability (i.e. capacity). This makes load balancing and failure handling only a matter of bucket placement. That greatly increases efficiency because the cluster manager is not directly involved in actual data movement and because bucket placement is independent of the amount of data in the cluster, which makes cluster wide resource balancing a size independent problem.

The placement of all buckets in the cluster is represented by a storage bucket map which is available to all database servers and storage servers. Each storage bucket is allowed to be independently mirrored as determined by the cluster manager. Every bucket has an associated incarnation number or location version number that signifies the latest version of the storage bucket map and also helps detect recency or staleness of I/O requests as discussed later herein. A database server includes a location version number in an I/O request. If the location version number in the request does not match the location version number at the receiving storage server, then the IO request is detected as stale and rejected. Responsively, the database server refreshes its bucket map and sends the request again, but with the latest version number to use and possibly to a different storage server.

When a bucket needs to be relocated from a previous storage server to another based on the cluster manager's autonomous decision, the previous storage server is responsible for the data movement to ensure that the two copies are maintained up to date and, eventually when the previous storage server detects that the data movement is done, the cluster manager updates the storage bucket map and pushes this information to all storage servers and database servers.

This approach includes the following innovations. It enables hyper-scale and elasticity of persistent storage with dramatically less amount of storage metadata to be managed at a distributed global level. For acceleration, this approach performs database operations using this dramatically small size of storage metadata. This approach has the ability to asynchronously update the storage bucket map and continue to perform ongoing and concurrent I/Os during dynamic and autonomous capacity and placement changes in a storage area network (SAN). This makes it straightforward to do storage management operations and extend and shrink the total storage footprint with live clients. For acceleration, this approach is compatible with remote direct memory access (RDMA).

This approach provides the following advantages. This storage architecture accesses the data layer directly from the database server, without various cloud storage mediation layers such as a LUN metadata server as discussed in the Background. This allows for very low database I/O latency because there are no wasted network hops and central processing unit (CPU) computation spanning various layers of software and local and remote hardware. The database server herein can send smart data requests (e.g. smart scan) directly to storage servers with no intermediate network elements such as a LUN metadata server. This direct transfer of an I/O request provides a database server with RDMA access to database content, enabling dramatically lower latency and higher throughput for both online transaction processing (OLTP) and online analytical processing (OLAP) database workloads.

1.0 Example Distributed System

FIG. 1 is a block diagram that depicts example distributed system 100 that has an accelerated interface between database server 110 and a storage area network (SAN) that includes storage servers 121-122. Each of servers 110 and 121-122 may be one or more instances of a rack server such as a blade, a mainframe, a virtual machine, or other computing device. Computers herein are interconnected by a communication network (not shown) such as a local area network (LAN) or an internetwork. The remaining components shown in FIG. 1 may be stored and operated in volatile or nonvolatile storage of respective one or more computers herein.

Database server 110 may contain or be operated by a database management system (DBMS). Database server 110 may operate one or more persistent databases, including database 115 that may be a relational database, a graph database, a NoSQL database, a geographic database, or a document database that stores semi-structured documents such as JavaScript object notation (JSON) or extensible markup language (XML). Database 115 is shown with a dashed outline to indicate that database 115 does not persistently reside inside database server 110. For example, database server 110 may cache a small portion of database 115 for ongoing processing. Database 115 is persistently stored in pieces in storage servers 121-122 as discussed later herein.

In operation, database server 110 may receive or generate database commands such as database statements. For example, database server 110 may process structured query language (SQL) statements, data manipulation language (DML), data query language (DQL), and data definition language (DDL).

In a first scenario, database server 110 executes one database statement, for which access requests 131-132 are generated and sent by database server 110. In a second scenario, database server 110 executes two database statements, for which respective access requests 131-132 are generated and sent by database server 110. For example, access requests 131-132 may or may not be for a same database command, and access requests 131-132 may or may not be for a same database transaction. As discussed later herein, access request 131 may be optimistic and fail, and access request 132 may retry the same access in a pessimistic way that will succeed.

Access request 131 contains shown storage metadata fields 141 and 171-175. Although not shown, access request 132 contains the same storage metadata fields, some of which may have same or different values as access request 131. Generation of access request 131 by database server 110 targets storage bucket 155 as follows.

Database 115 is persisted as pieces of data and metadata in multiple database extents that logically (i.e. not physically) reside in storage buckets. A storage bucket is storage metadata that logically aggregates database storage objects that are stored in a same storage server, such as database files and database extents. Because a storage bucket is only a logical or virtual container, a storage bucket does not physically contain database content, which is why storage buckets 155-156 are shown with dashed outlines. Each of storage buckets 155-156 is a dynamically-resizable logical aggregation of persistent data that includes one or more coarse-grained database objects such as a database file, a tablespace, a relational table, or a database index. Subsets of fine-grained database objects such as multiple table rows or multiple table columns may be stored in a database extent that is a physically contiguous persistent storage allocation, such as multiple contiguous disk blocks, inside a storage drive in one of storage servers 121-122.

Different database extents may have different respective sizes, but the size of a database extent does not change after creation of the extent. Each coarse-grained database object may contain one or more database extents whose count may be dynamic. Most examples of one of access requests 131-132 may correspond to SQL SELECT and UPDATE statements, which neither create nor discard a database extent. However, SQL statements such as INSERT, DELETE, DROP, and CREATE might each create or discard database extent(s). A database extent may contain data or metadata or both.

As discussed in the Background, state of the art access to a database object persisted in a storage drive entails a logical unit identifier (LUN). Distributed system 100 does not use LUNs and may, for example, not implement LUNs. In a preferred embodiment, none of the components shown in FIG. 1 contain a LUN. Discussed later herein are storage drive identifiers D1-D2 that are not LUNs.

Distributed system 100 instead uses bucket numbers. Bucket number 171 is a bucket identification number that is a nonnegative integer that may be used as an element offset into an array of buckets or an array of bucket metadata. Bucket number 171 also is a hash code generated by a storage hash function that is a hash function that accepts arguments that are identifiers from either of access requests 131-132 as follows. In an embodiment and because bucket number 171 is a hash code generated from identifiers in access request 131, bucket number 171 may be implied and not contained in access request 131, which is why bucket number 171 is shown with a dashed outline.

In an embodiment, bucket number 171 is a hash code based on only two arguments, which are identifiers 174-175 as follows. Database 115 may consist of one or more database files (not shown) persisted in one or more storage buckets. A database file is a sequence of database extents, and that sequence is logically contiguous but not physically contiguous. For example, file identifier 174 may identify a database file that consists of four database extents that are respectively persisted or logically aggregated in components

122, 152, and 155-156. Multiple database extents in a same database file may, for example, be logically aggregated in storage bucket 155.

Depending on the embodiment, either: a) a database file is logically treated as an array of database extents, and extent offset 175 is an element offset into that array, or b) a database file is logically treated as an array of bytes, and extent offset 175 is a count of how many bytes to seek into the database file to access the database extent. In both cases, extent offset 175 is an extent identification number that is nonnegative.

File identifier 174 is globally unique within database 115. Extent offset 175 is locally unique within a database file, but is not globally unique within database 115. In database 115, two database extents may have a same extent offset, but two database files cannot have a same file identifier.

Servers 121 and 110 operate respective storage bucket maps 105-106 that are identical replicas unless sometimes inconsistent, which is remedied as discussed later herein. Although not shown, storage server 122 also contains a replica of the storage bucket map. In other words, distributed system 100 has only one storage bucket map, and that storage bucket map has multiple replicas.

As shown, storage bucket map 105 consists of four columns and, shown bold, two rows. Shown above the two bold rows are demonstrative metadata that describes the structure of storage bucket map 105 as follows. Storage bucket map 105 consists of key-value pairs. Here, column bucket number contains keys of pairs, and column storage bucket contains storage buckets that are values of pairs. As shown, column storage bucket is compound and consists of column location version number, column storage server identifier, and column storage drive identifier.

Each row or entry in storage bucket map 105 contains a storage bucket that is storage metadata that includes location metadata for the storage bucket. For example: a) bucket numbers 171 and B1 may be identical and identify storage bucket 155, b) storage server identifier S1 may identify storage server 121, and c) storage drive identifier D1 may identify storage drive 151. In that case and as shown in storage bucket map 105, bucket number 171 may be used as a lookup key into storage bucket map 105 to retrieve storage bucket 155.

When generating and sending access request 131, database server 110 may sequentially: a) hash a combination (e.g. concatenation) of identifiers 174-175 to generate bucket number 171, b) use bucket number 171 as a lookup key into storage bucket map 106 to dynamically discover storage identifiers D1 and S1, and c) store the storage server identifier S1 into access request 131 as storage server identifier 172. As discussed earlier herein, none of (a)-(b) requires access request 131 contain bucket number 171.

Because storage bucket map 106 provides storage identifiers D1 and S1, database server 110 is able to send access request 131 directly to storage server 121 and, for novel acceleration, without having to consult a LUN metadata server as discussed in the Background. For example, access request 131 may consist of one or more network packets that database server 110 generates and sends, and storage server identifier 172 may be a network address that identifies storage server 121. For example, storage server identifiers 172 and S1 may be the internet protocol (IP) address of storage server 121. As discussed later herein, database server 110 may without sending, receiving, processing, storing, nor generating a LUN: a) obtain data structures 106 and S1 and b) generate and send access request 131 to storage server 121.

Data structures 105-106 and 131-132 do not contain a LUN. In the shown embodiment, access requests 131-132 do not contain a storage drive identifier.

Herein, a count of storage buckets and their set of bucket numbers for use by database 115 are fixed. However in various planned and unplanned scenarios, a storage bucket may: a) move from one storage drive to another storage drive or to another storage server or b) have a replica of the storage bucket created or discarded. Here, (a)-(b) do not allocate new bucket numbers.

Herein are two distinct hash functions with distinct respective purposes: 1) a storage hash function that returns a bucket number as discussed above, and 2) a network hash function that returns a storage server identifier as follows. The network hash function accepts only two arguments: a bucket number and a count of storage servers in distributed system 100. For example when bucket number 171 is an argument of the network hash function, then the network hash function returns the storage server identifier of storage server 121.

Herein, a storage server identifier may have two distinct representations: a) a normative representation such as an IP address and b) a storage server identification number that is a nonnegative integer that may be used as an element offset into an array of metadata of storage servers. Here, (b) is what the network hash function returns.

In an important scenario, the speed and reliability of distributed system 100 is dynamically increased by dynamically increasing the storage capacity of distributed system 100 by dynamic addition of a new storage computer, to which distributed system 100 autonomously reacts as follows. Distributed system 100 autonomously selects and moves some storage buckets to the new storage computer as follows.

Addition of a new storage computer effectively increases by one the range of storage server identification numbers that the network hash function can return, which is why the network hash function accepts an argument of a count of storage servers in distributed system 100. With a naïve hash function, increasing the range of hash codes by one requires rehashing. Rehashing would beneficially achieve storage load balancing.

For example, twelve storage buckets may initially be equally divided between three storage servers, which is four buckets per storage server. When a new fourth storage server is added, storage load balancing entails moving three storage buckets to the new storage server so that each of the four storage servers may is assigned three storage buckets, which is fewer buckets per server than there initially were.

Ideally, each of the three existing storage servers should move only a respective one storage bucket to the new storage server, and no other buckets should move. However, rehashing does not work that way. Rehashing is highly inefficient and needlessly moves too many (e.g. most or all) storage buckets. Rehashing is a disruptive and slow activity that entails reassignment of new hash codes to all items already hashed. In the case of hash codes that are storage server identifiers, rehashing would entail moving all of the storage buckets around in distributed system 100 between all of the storage servers, which is a very slow way to rearrange the placement of storage buckets.

Herein for accelerated reaction to addition of a new storage computer, the network hash function is a consistent hash function that minimizes reassignment of storage buckets to storage computers as follows. The network hash function regenerates hash codes for all storage buckets. Because the network hash function is a consistent hash function instead of a naïve hash function, most of the regenerated hash codes are identical to the previous hash codes. Only the few storage buckets that hash to a different hash code than before are moved, and the new hash code by design is the storage server identifier of the new storage server. For acceleration, only those few storage buckets are moved, and they all are moved to the new storage server.

In another important scenario, the speed and reliability of distributed system 100 is increased by optimistic data access in which database server 110 optimistically presumes a storage bucket has not moved, which is likely due to consistent hashing that minimizes movement due to capacity changes. Distributed system 100 notifies all servers 110 and 121-122 whenever a storage bucket moves to a different storage drive or storage computer. For example in an embodiment, storage bucket maps 105-106 are implicitly synchronized by design. However for acceleration, such notification or synchronization may be asynchronous, low priority, or even unreliable. Such deferral, unreliability, or avoidance is an acceleration of distributed system 100 because notification or synchronization entails latency that, in distributed system 100, does not occur in the critical path of processing access request 131 by storage server 121.

Respective processing and intercommunication by servers 110 and 121-122 is asynchronous. For example, distributed system 100 may autonomously and asynchronously move storage bucket 155 from storage server 121 to storage server 122 while database server 110 is using or preparing to use storage bucket 155. For example, storage bucket 155 may move to storage server 122 during transport of access request 131 to storage server 121. Thus in some scenarios, storage server 121 receives access request 131 for storage bucket 155 that storage server 121 no longer is assigned.

Storage server 121 extracts or derives bucket number 171 from access request 131 as discussed earlier herein, and storage server 121 uses bucket number 171 as a lookup key into storage bucket map 105. When storage server 121 previously was assigned storage bucket 155, that lookup would have: a) confirmed that storage server 121 is assigned storage bucket 155 and b) provided the storage drive identifier of storage drive 151. In that case, storage server 121 would fully execute access request 131 and generate and send a response 133 that is a success response (e.g. containing retrieved database content) back to database server 110.

However because storage bucket 155 has since moved to storage server 122, that lookup by storage server 121 instead reveals that storage server 121 is not assigned storage bucket 155 and, in that case, response 133 is an error response that does not contain database content and instead indicates that storage server 121 is not assigned storage bucket 155. In an embodiment, each storage bucket has a respective location version number that is a monotonically-increasing nonnegative integer. Anytime a storage bucket moves, its entry in the storage bucket map is adjusted: a) the location version number is incremented by one, b) the server and drive identifiers are updated to reflect the new location, and c) the bucket number is unchanged.

A location version number is neither a content version number nor a location identifier. For example when storage bucket 155 moves, its location version number V1 increases, but the content of storage bucket 155 is unchanged. Likewise so long as storage bucket 155 does not move, its location version number is unchanged even if the contents of storage bucket 155 is partially, completely, or repeatedly overwritten.

Likewise even if contents of storage bucket 155 never changes, storage bucket 155 may in sequence: 1) have an initial location version number, then 2) move to either of storage components 122 or 152, and then 3) move back to storage drive 151. In that case: a) storage bucket 155 in (3) has the same contents and location as it initially had in (1), but b) the location version number of bucket 155 is not the same in (3) as in (1). Indeed, the location version number of bucket 155 is different (i.e. monotonically increasing) in each of (1), (2), and (3).

If storage server 121 detects that location version number V1 in storage bucket map 105 is greater than location version number 141 in access request 131, then storage server 121 decides that access request 131 is stale (i.e. no longer valid). In that case, database server 110: a) detects that response 133 is the error response discussed above, and b) if access request 131 occurs in a database transaction, database server 110 does not fail the database transaction and instead sustains the ongoing database transaction as follows.

To compensate for the failure of access request 131, database server 110: a) refreshes (i.e. synchronizes) its copy of storage bucket 155 or refreshes all of storage bucket map 106 and b) generates and sends access request 132 as a copy of access request 131. Access request 132 is an inexact copy because access request 131 contains stale values of identifiers 141 and 172, and access request 132 instead contains fresh values of identifiers 141 and 172, which is why access request 132 is instead sent to storage server 122.

In that way, database server 110 compensates for its own inability to perfectly predict where a storage bucket currently resides. This compensation is invisible (i.e. seamless) to both of the database transaction and the database client (not shown). Because most storage buckets do not move, optimistic locating of storage buckets by database server 110 is usually accurate. Thus, optimistic acceleration exceeds any deceleration caused by rarely inaccurate locating by database server 110. In that way, optimistic distributed system 100 is unconventionally faster than the state of the art at executing database commands.

2.0 Example Storage Server Process

Figure 2:
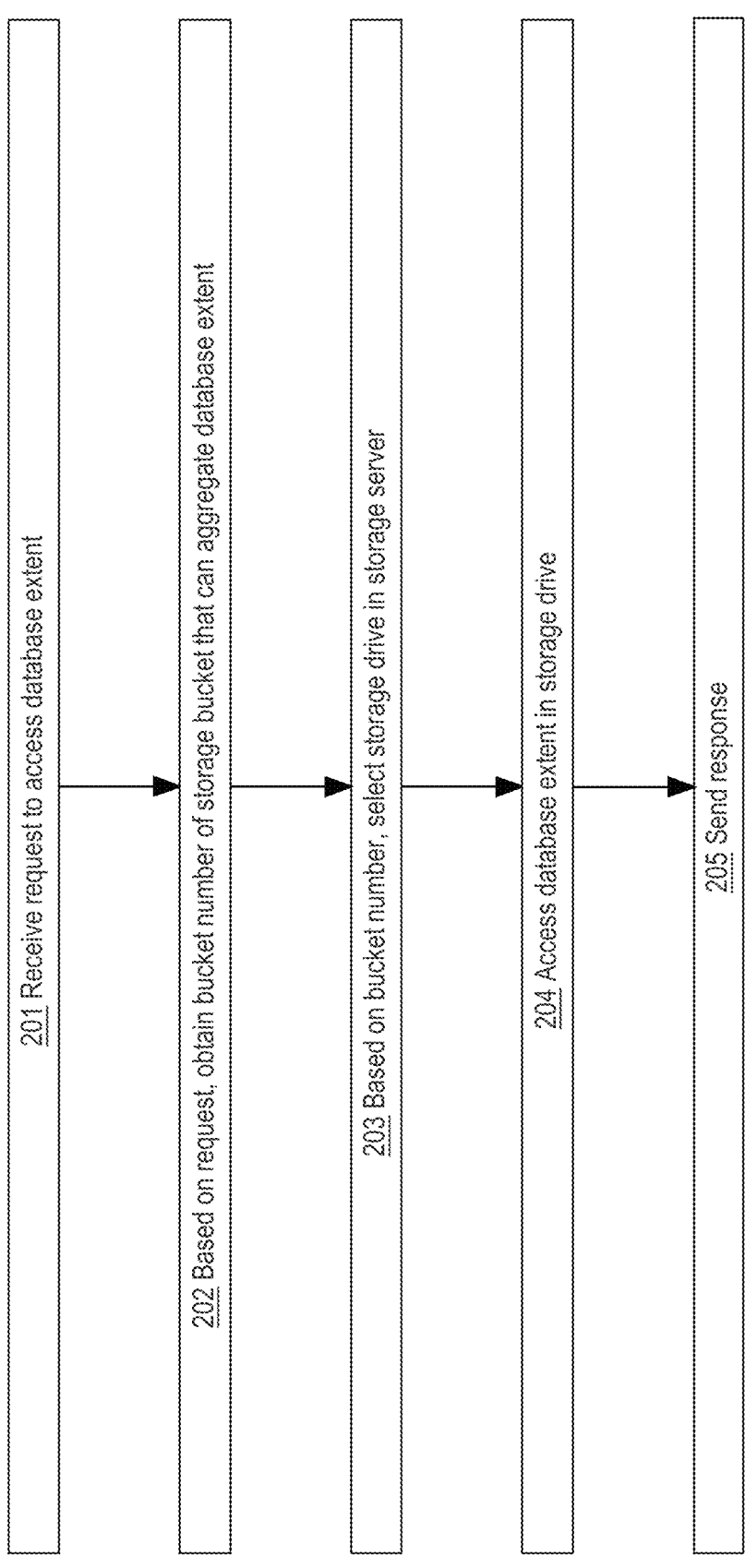
FIG. 2 is a flow diagram that depicts an example process that a storage server may perform to accelerate both of a database and a database server.

FIG. 2 is a flow diagram that depicts an example process that either of storage servers 121-122 may perform to accelerate components 110 and 115.

Step 201 receives access request 131 that requests accessing database extent 161, for which access request 131 contains storage identifiers 172 and 174-175 as discussed earlier herein.

Based on storage identifiers in access request 131, step 202 obtains bucket number 171 that identifies storage bucket 155 that can logically aggregate database extent 161. For example, access request 131 might specify creating, reading, updating, or deleting (CRUD) a database object. If access request 131 is a request to create database extent 161, such as for a SQL CREATE or INSERT statement, then storage bucket 155 will not logically aggregate database extent 161 until the extent is created by step 204 below.

As discussed earlier herein, step 202 obtaining bucket number 171 may entail either: a) extracting bucket number 171 from access request 131 or b) extracting storage identifiers 174-175 from access request 131 and invoking the storage hash function with those storage identifiers. As discussed later herein, obtaining a bucket number from an access request, by extraction or by hashing, is referred to as bucket number attainment.

As discussed earlier herein and based on bucket number 171, step 203 optimistically selects storage drive 151 in storage server 121 as a location where storage bucket 155 should still be, unless very recently moved.

Based on access request 131 and storage bucket map 105 as discussed earlier herein, step 204 accesses database extent 161 that is aggregated by storage bucket 155 that is assigned to storage drive 151. If access request 131 is a deletion, such as a SQL DROP or DELETE, then database extent 161 no longer exists after step 204. Otherwise, step 204 reads or writes database extent 161 in storage drive 151.

Step 205 generates and sends response 133 back to database server 110 as discussed earlier herein.

3.0 Example Storage Acceleration Activities

FIG. 3 is a flow diagram that depicts example storage acceleration activities that either of storage servers 121-122 may perform in an example scenario in which movement of a storage bucket causes an access request to become stale as follows. The steps of FIGS. 2-3 are complementary and may be combined or interleaved. For example, the process of FIG. 2 may be extended or specialized by inclusion of some or all of the steps of FIG. 3.

For accelerated transfer of access request 131, step 301 receives access request 131 as a first remote direct memory access (RDMA) request that copies access request 131 from random access memory (RAM) in database server 110 to RAM in storage server 121.

Step 302 uses bucket number 171 as a lookup key to retrieve, from storage bucket map 105, a storage bucket that is storage metadata that contains storage identifiers D1, S1, and V1 that define storage bucket 155 as discussed earlier herein.

Step 303 detects that access request 131 is not stale by detecting that location version number 141 in access request 131 is not less than location version number V1 in the storage bucket.

Between steps 303-304, response 133 is generated and sent as a success response as discussed earlier herein. Responsive to autonomous control by distributed system 100, step 304 moves storage bucket 155 from storage drive 151 to a storage drive in storage server 122 as discussed earlier herein, and this causes step 305 to increment, by one, location version number V1 in the storage bucket. Incrementation by step 305 may be synchronized to multiple storage bucket maps 105-106 as discussed earlier herein.

Step 306 receives second access request 132. The scenario of FIG. 3 has the following enumerated aspects. First, access requests 131-132 may or may not be concurrently generated, may or may not be concurrently sent, and may or may not be concurrently received. Second, response 133 indicates success and is generated before storage server 121 processes access request 132. Third, both access requests 131-132 contain same location version number 141 and attempt to access same storage bucket 155. Fourth, access request 132 fails as follows.

Based on location version number 141 in access request 132 and, unlike step 303, step 307 detects that location version number 141 is stale (i.e. less than location version number V1 that was incremented). Responsively, step 307 rejects access request 132 by generating and sending an error response to database server 110 as discussed earlier herein, in which case database server 110 may compensate (i.e. retry) as discussed earlier herein.

4.0 Example Database Server Process

Figure 4:
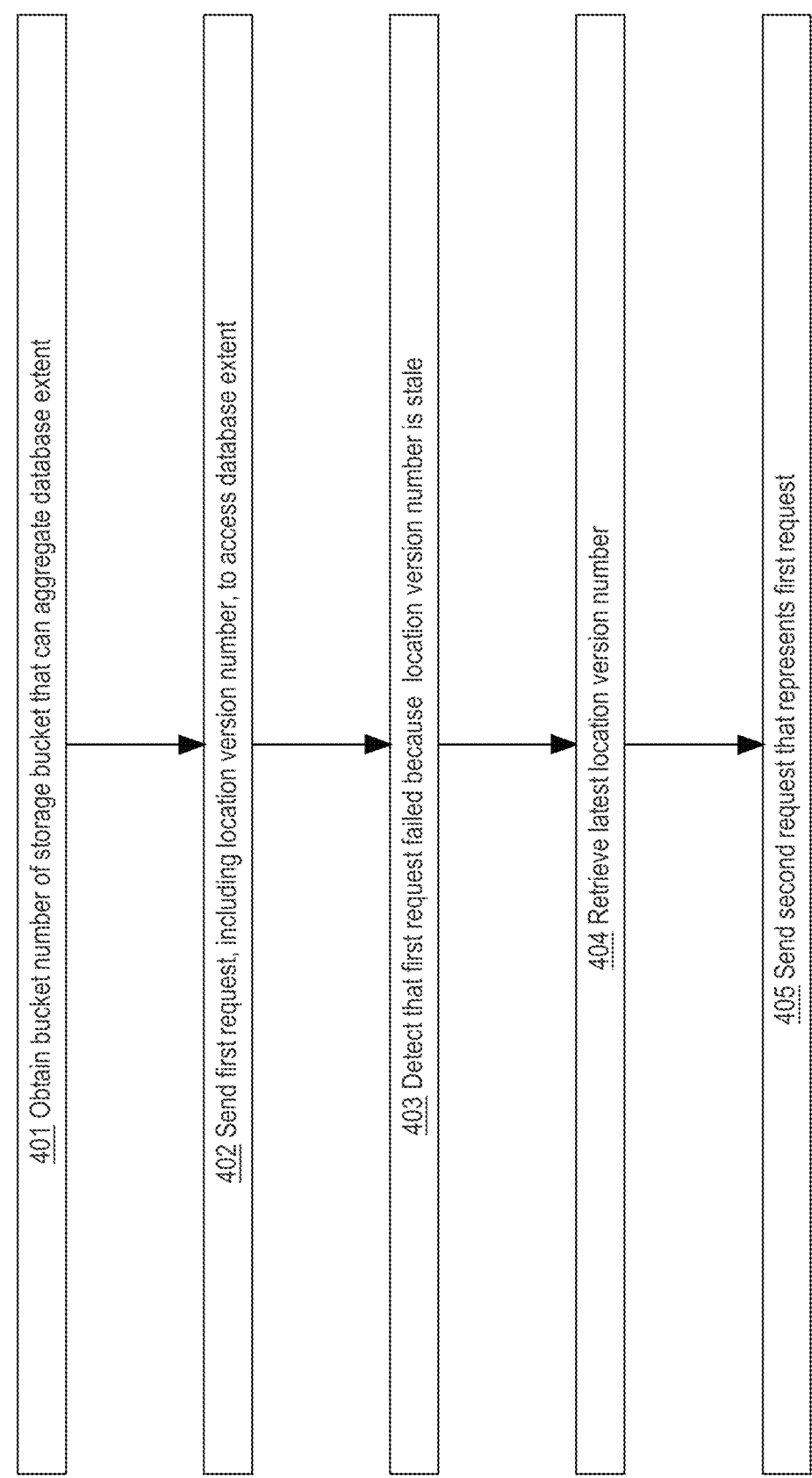
FIG. 4 is a flow diagram that depicts an example process that a database server may perform to accelerate both of a database and the database server.

FIG. 4 is a flow diagram that depicts an example process that database server 110 may perform to accelerate components 110 and 115. For example, servers 110 and 121 may cooperate by concurrently performing the respective processes of FIGS. 4 and 2.

Step 401 obtains bucket number 171 that identifies storage bucket 155 according to bucket number attainment as discussed for FIG. 3, except that step 401 uses storage bucket map 106 instead of storage bucket map 105, both of which usually are identical (i.e. synchronized) replicas.

Step 402 sends access request 131 to storage server 121, but then step 403 detects that error response 133 indicates that access request 131 failed because location version number 141 is stale. This means that at least storage bucket 155 in storage bucket map 106 is stale and should not be used until refreshed as follows. Steps 404-405 in sequence are a reaction to detected staleness as follows.

Step 404 retrieves, from any storage server or other database server in distributed system 100, a latest location version number. Depending on the embodiment, step 404 may entail retrieval of a single storage bucket from another server or retrieval of the entire storage bucket map from the other server. When step 404 finishes, either that single storage bucket or entire storage bucket map 106 is fresh (i.e. not stale) and ready to use.

Step 405 compensates for error response 133 by generating and sending access request 132 that is an inexact copy of access request 131, where storage identifiers 141 and 172 are changed in access request 132 to reflect the fresh location metadata retrieved by step 404. After step 405, database server 110 receives a success response that indicates that access request 132 succeeded as discussed earlier herein.

5.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
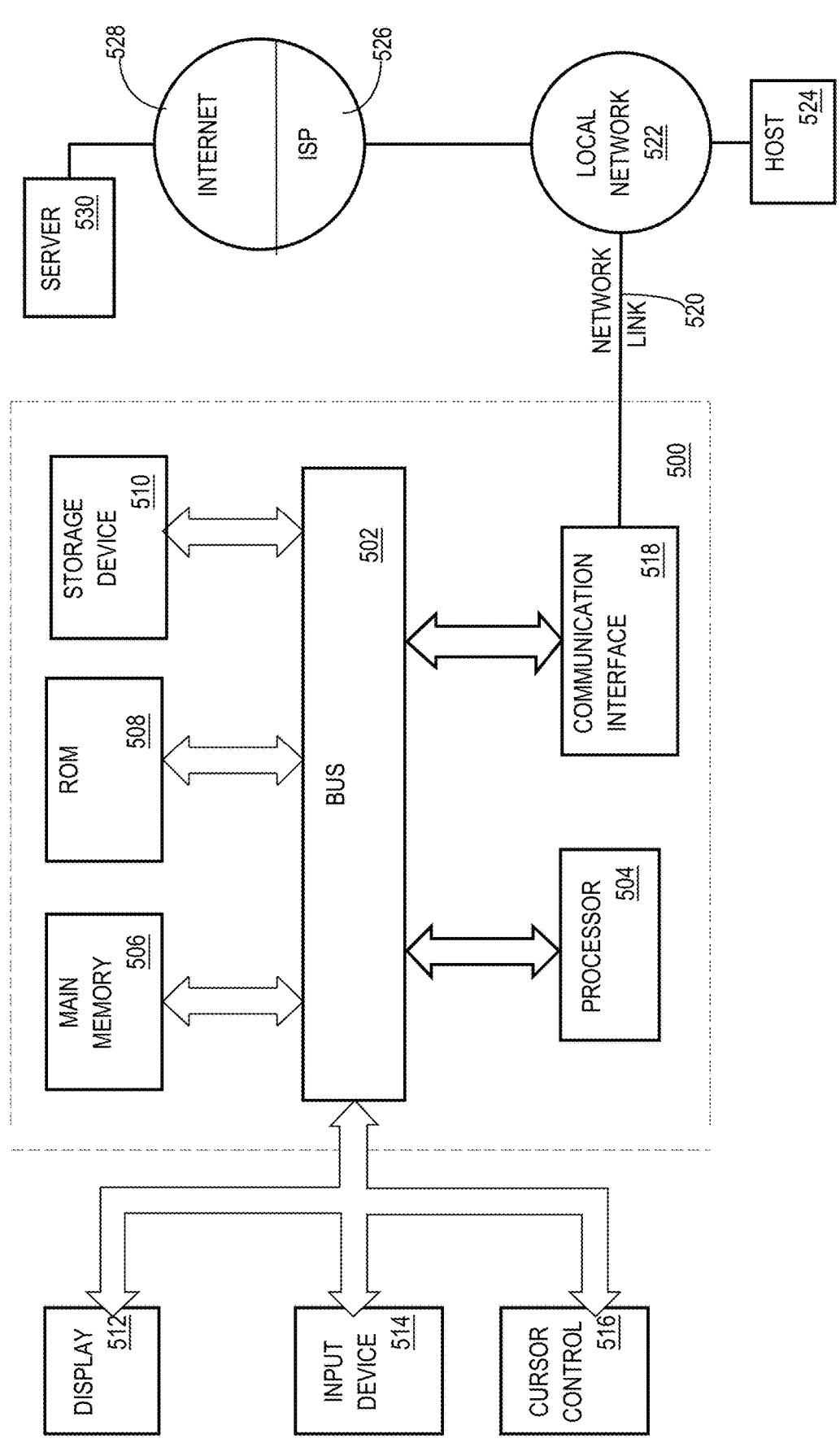
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
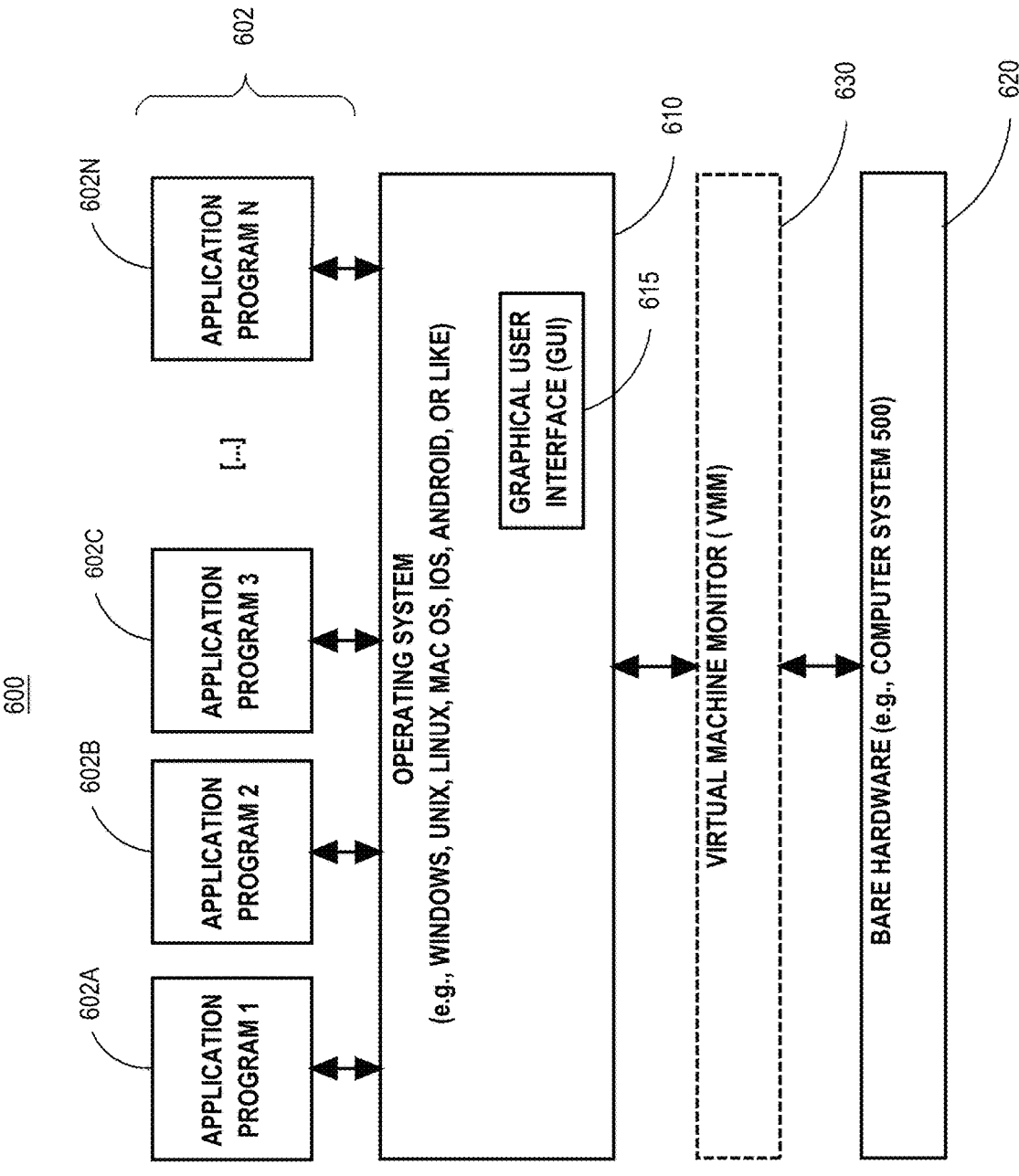
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

receiving through a communication network, from a database server that operates a database, a request to access a database extent in a database file of the database, wherein the database is one of a relational database, a graph database, a geographic database, or a document database;

obtaining, based on the request, a bucket number of a storage bucket that can aggregate the database extent in the database file;

selecting a storage drive, in a storage server, that is associated with the bucket number of the storage bucket in a storage bucket map in the storage server;

accessing, in the storage drive, the database extent in the database file; and sending, to the database server, a response that is based on said accessing;

wherein the method is performed by the storage server.

2. The method of claim 1 wherein:

said selecting comprises using the bucket number of the storage bucket as a lookup key to retrieve the storage bucket;

the storage bucket contains an identifier of the storage drive and an identifier of the storage server.

3. The method of claim 2 wherein:

the request contains a location version number;

the storage bucket contains a location version number;

the method further comprises detecting that the location version number in the request is not less than the location version number in the storage bucket;

said selecting is responsive to said detecting.

4. The method of claim 3 wherein:

said storage drive is a first storage drive;

the method further comprises:

moving the storage bucket from said first storage drive to a second storage drive;

increasing, in response to said moving, the location version number in the storage bucket.

5. The method of claim 3 wherein:

said request is a first request;

the method further comprises after said sending:

receiving a second request that contains the location version number of the first request, and rejecting, based on the location version number in the second request, the second request.

6. The method of claim 1 wherein said receiving from the database server comprises receiving a remote direct memory access (RDMA) request.

7. The method of claim 1 wherein the request contains none of: a logical unit number (LUN) and an identifier of the storage drive.

8. A method comprising:

obtaining a bucket number of a storage bucket that can aggregate a database extent in a database file;

sending, based on the bucket number of the storage bucket, a first request to access the database extent in the database file, wherein the first request contains a location version number that is associated with the bucket number of the storage bucket in a storage bucket map in a database server;

detecting that the first request failed because the location version number of the storage bucket is stale; and in response to said detecting:

retrieving a latest location version number of the storage bucket, and sending a second request that represents the first request except that the second request contains said latest location version number of the storage bucket;

wherein:

the method is performed, by the database server, in a single database transaction for a database that includes the database file, and the database is one of a graph database, a geographic database, or a document database.

9. The method of claim 8 wherein:

said sending the first request comprises sending to a first storage server;

said sending the second request comprises sending to a second storage server.

10. The method of claim 9 further comprising the database server generating the first request including storing, in the first request, an identifier of the database server or an identifier of the first storage server.

11. One or more non-transitory computer-readable media storing instructions that, when executed by one or more processors in a storage server, cause:

receiving through a communication network, from a database server that operates a database, a request to access a database extent in a database file of the database, wherein the database is one of a relational database, a graph database, a geographic database, or a document database;

obtaining, based on the request, a bucket number of a storage bucket that can aggregate the database extent in the database file;

selecting a storage drive, in the storage server, that is associated with the bucket number of the storage bucket in a storage bucket map in the storage server;

accessing, in the storage drive, the database extent in the database file; and sending, to the database server, a response that is based on said accessing.

12. The one or more non-transitory computer-readable media of claim 11 wherein said selecting comprises using the bucket number of the storage bucket as a lookup key to retrieve the storage bucket.

13. The one or more non-transitory computer-readable media of claim 12 wherein:

the request contains a location version number;

the storage bucket contains a location version number;

the instructions further cause detecting that the location version number in the request is not less than the location version number in the storage bucket;

said selecting is responsive to said detecting.

14. One or more non-transitory computer-readable media storing instructions that, when executed by one or more processors in a database server, cause in a single database transaction for a database that includes a database file:

obtaining a bucket number of a storage bucket that can aggregate a database extent in the database file;

sending, based on the bucket number of the storage bucket, a first request to access the database extent in the database file, wherein the first request contains a location version number that is associated with the bucket number of the storage bucket in a storage bucket map in the database server;

detecting that the first request failed because the location version number of the storage bucket is stale; and in response to said detecting:

retrieving a latest location version number of the storage bucket, and sending a second request that represents the first request except that the second request contains said latest location version number of the storage bucket;

wherein the database is one of a graph database, a geographic database, or a document database.

15. The one or more non-transitory computer-readable media of claim 14 wherein:

said sending the first request comprises sending to a first storage server;

said sending the second request comprises sending to a second storage server.

16. The one or more non-transitory computer-readable media of claim 15 wherein the instructions further cause the database server generating the first request including storing, in the first request, an identifier of the database server or an identifier of the first storage server.

* * * * *